Pense & Lyttle,
Harrow.

No. 87,872. Patented Mar. 16, 1869.

Witnesses:
S. Hailer
P. T. Dodge

Inventors:
G. W. Pense
C. E. Lykke
by Dodge & Munn
their Atty's

GEORGE W. PENSE AND CHRISTIAN EMIL LYKKE, OF FRANKLIN GROVE, ILLINOIS.

Letters Patent No. 87,872, dated March 16, 1869.

IMPROVEMENT IN HARROWS.

The Schedule referred to in these Letters Patent and making part of the same.

*To all whom it may concern:*

Be it known that we, GEORGE W. PENSE and CHRISTIAN EMIL LYKKE, of Franklin Grove, in the county of Lee, and State of Illinois, have invented certain new and useful Improvements in Harrows; and we do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use our invention, we will proceed to describe it.

Our invention relates to field-harrows, made of iron, and consists in the novel construction and combination of four iron harrows, by means of a double hinge and peculiar couple, so that one or more, or all of them, may be used as desired; and in providing separate places for hitching to them, so that they may harrow coarse or fine, as the nature of the soil requires.

In the drawings—

We construct four harrows, A, B, C, and D, of the same size, rectangular in form, and provided with the same number of teeth as shown in fig. 1.

On one end of each of the longitudinal bars, E, of each harrow, we form an eye, *a*, and first hinge the harrows together, in pairs, by the bolts F passing through these eyes.

The inner ends of these bolts F, we also provide with an eye, *b*, and then couple them together, by means of a ring, *c*, and hook-link *d*, as clearly shown in the same figure.

Figure 1:
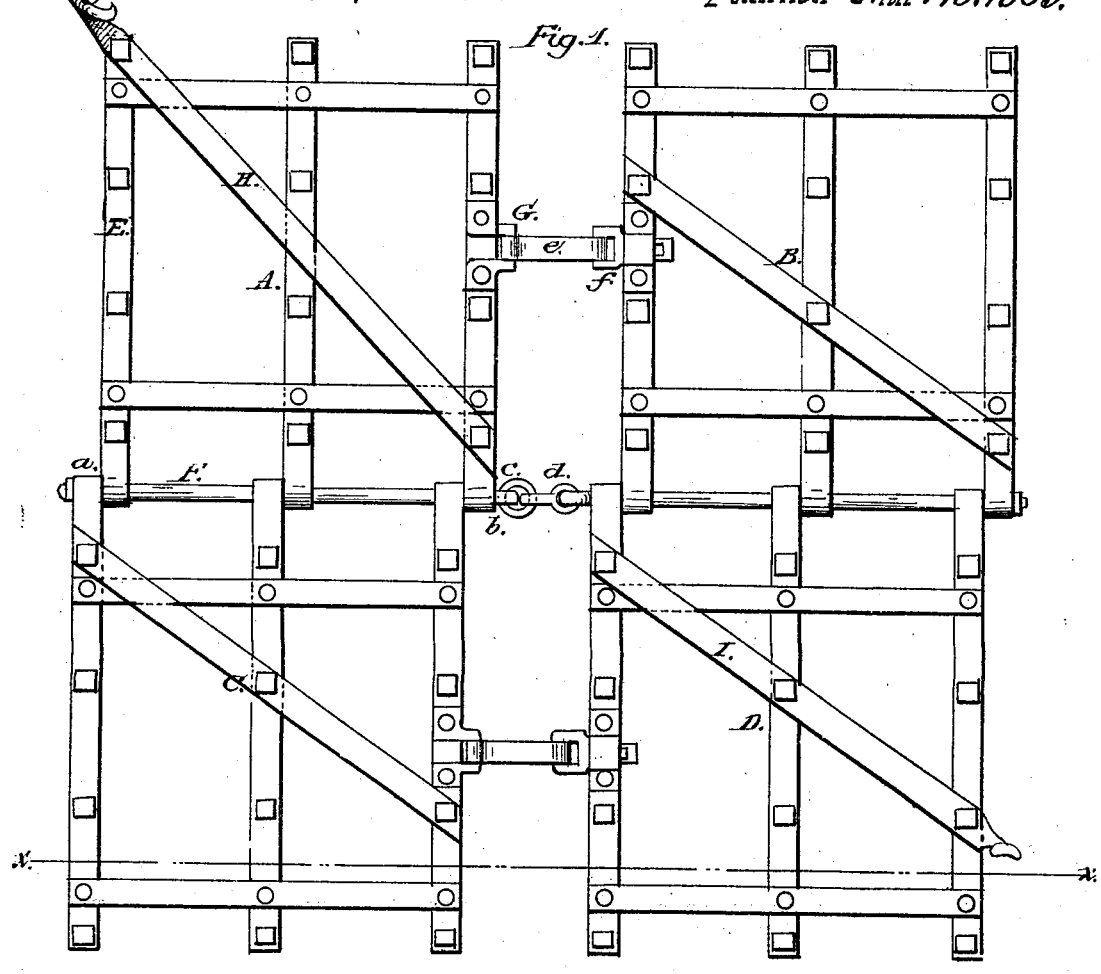
Figure 1 is a top plan view.
Figure 2:
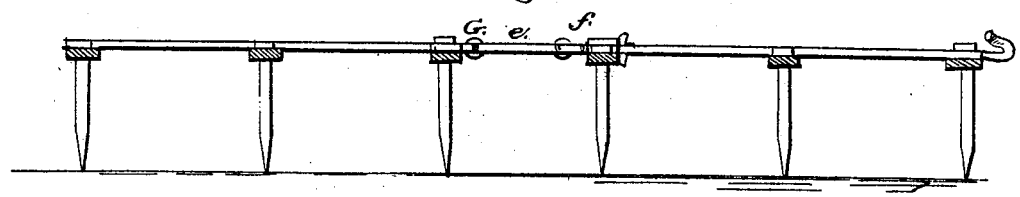
Figure 2 is a cross-section on the line *x–x* of fig. 1.

We then firmly attach, by riveting, or other suitable means, to the upper side of the inner bar E of the harrows A and B, and about midway from their ends, a hinge, G, with its arm *e* linked to an eye-bolt, *f*, the shank of which we key fast to the bars E of the harrows B and D, in the manner clearly shown in figs. 1 and 2.

These couplings we make of the required length, to have the opposite sides of the harrows parallel with each other.

To the upper side of the harrow A, we fasten the bar H, in nearly a diagonal direction, with a hitching-hook, *g*, on its outer end, and in like manner to the harrow D, the bar I, which is also provided with a similar hook, so that the harrows, when united, may be drawn in opposite directions, for the purpose of harrowing coarse or fine, as desired, the point of hitching to the harrow being properly located, in the construction, for that purpose.

In operating, all of these harrows may be used as one, when, as each has a movement independent of the other, it can adapt itself to the surface over which it is moving.

When desired for any purpose, two of them can be readily turned over on the backs of the other two, and also, when desired, by removing or loosening the eye-bolt *f*, they can all be piled together, that is, three of them on the back of the fourth.

In this way our compound harrow may be used to harrow over a broad surface at once, or over a narrower one, by doubling up, if desired.

As the parts are all made of iron, strongly riveted and fastened together, there is less likelihood of their getting out of repair, or of being injured or broken, as is the case when made partly of wood and partly of iron.

Harrows constructed in this way are not only more useful in the field than those constructed in the ordinary way, but they can be more compactly stored from the weather when not in use.

Having thus described our invention,

What we claim, is—

An iron harrow, consisting of four separate harrows, hinged and coupled together, substantially as described, and provided with hitching-hooks, so arranged that it may be drawn in opposite directions, for the purpose set forth.

G. W. PENSE.
CH. EMIL LYKKE.

Witnesses:
A. J. NICHOLS,
F. MORGAN.